April 1, 1947.　　　G. R. JENESON　　　2,418,122
PRESS FOR MAKING METAL HANDLES AND LINKS
Filed Aug. 3, 1943　　　4 Sheets-Sheet 3
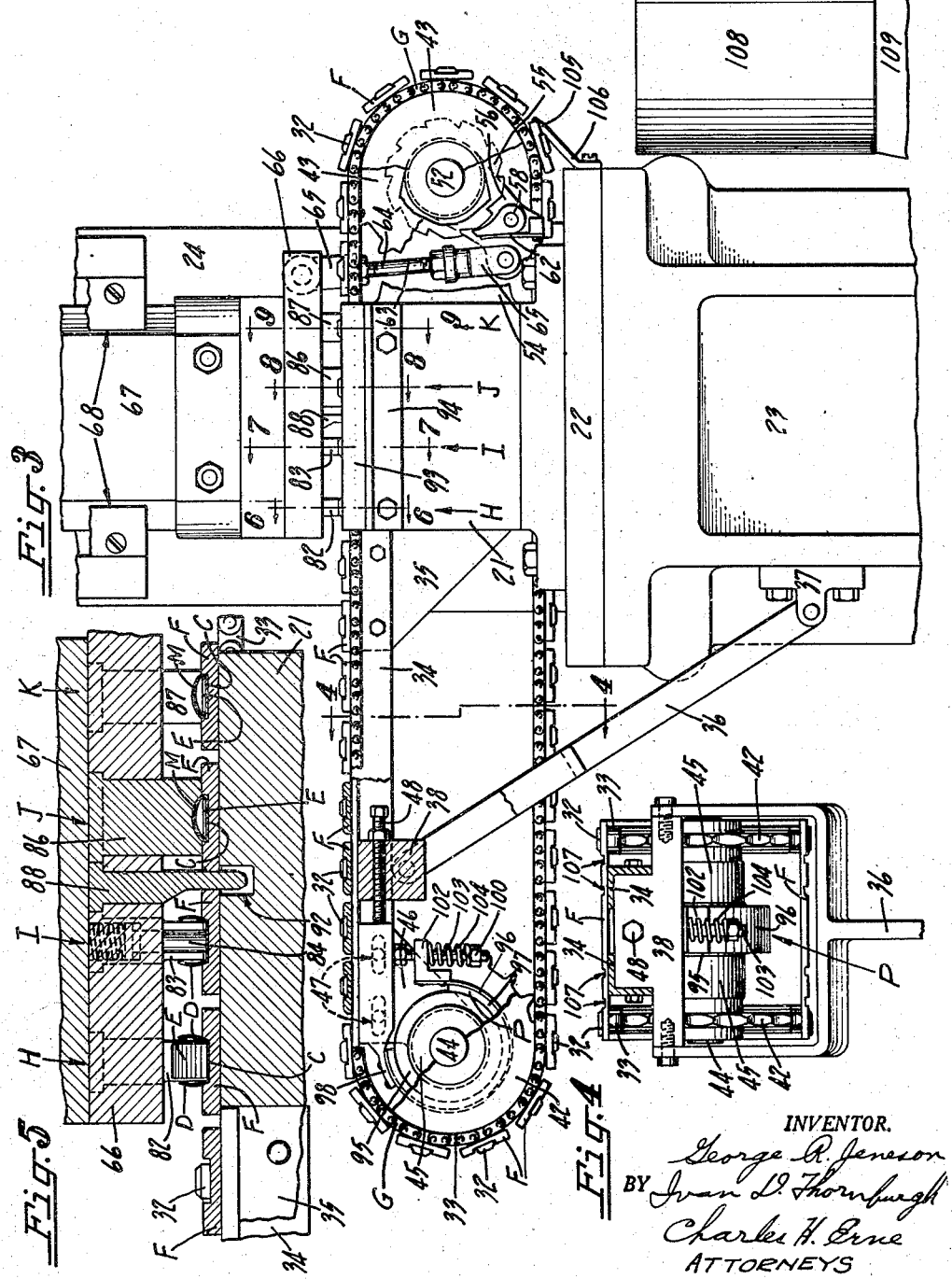
INVENTOR.
George R. Jeneson
BY Ivan D. Thornburgh
Charles H. Erne
ATTORNEYS April 1, 1947.                G. R. JENESON                2,418,122
            PRESS FOR MAKING METAL HANDLES AND LINKS
                    Filed Aug. 3, 1943           4 Sheets-Sheet 4
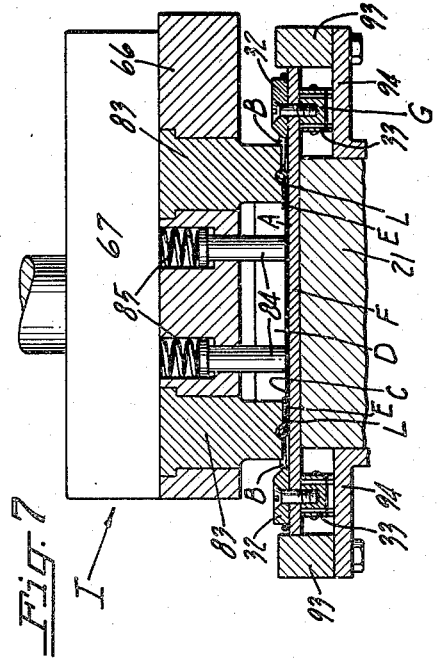
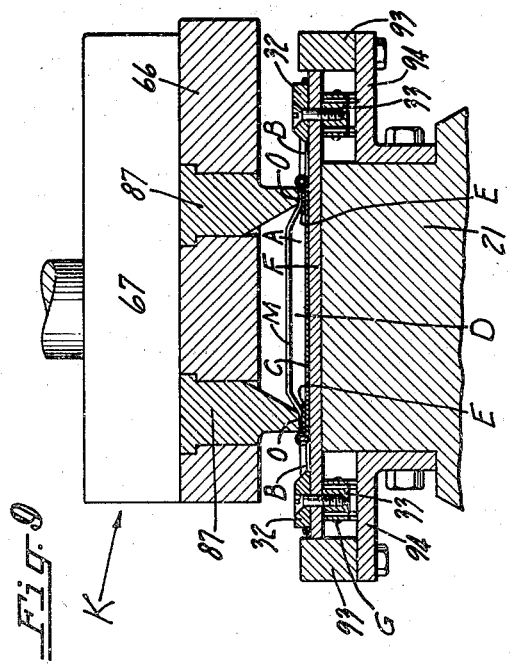
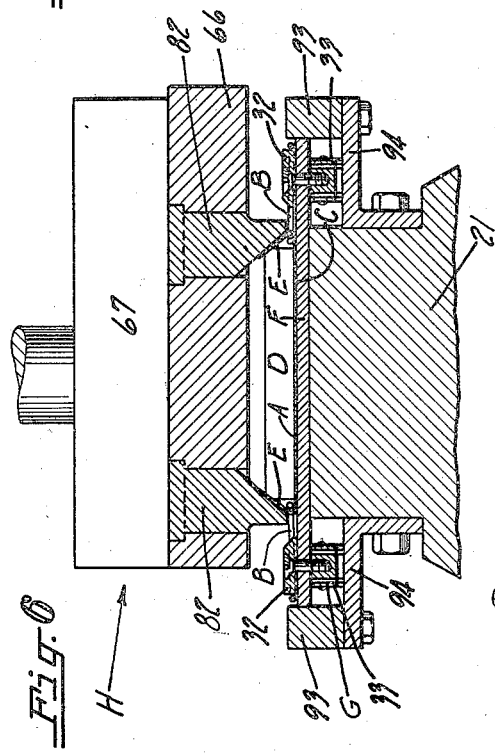
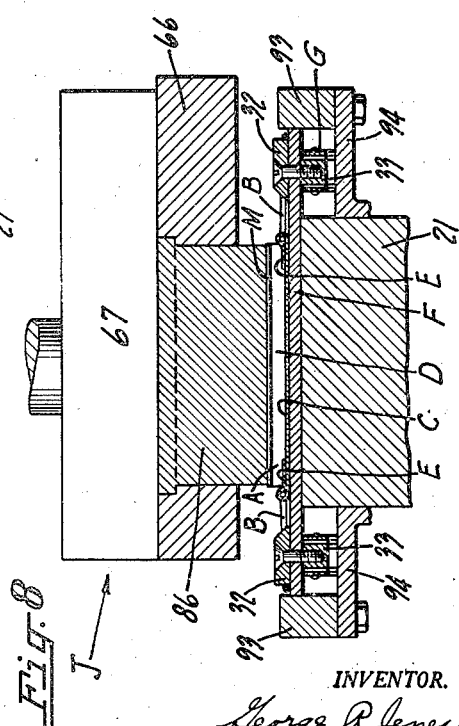
INVENTOR.
George R. Jeneson
BY Ivan D. Thornburgh
Charles H. Erne
ATTORNEYS Patented Apr. 1, 1947

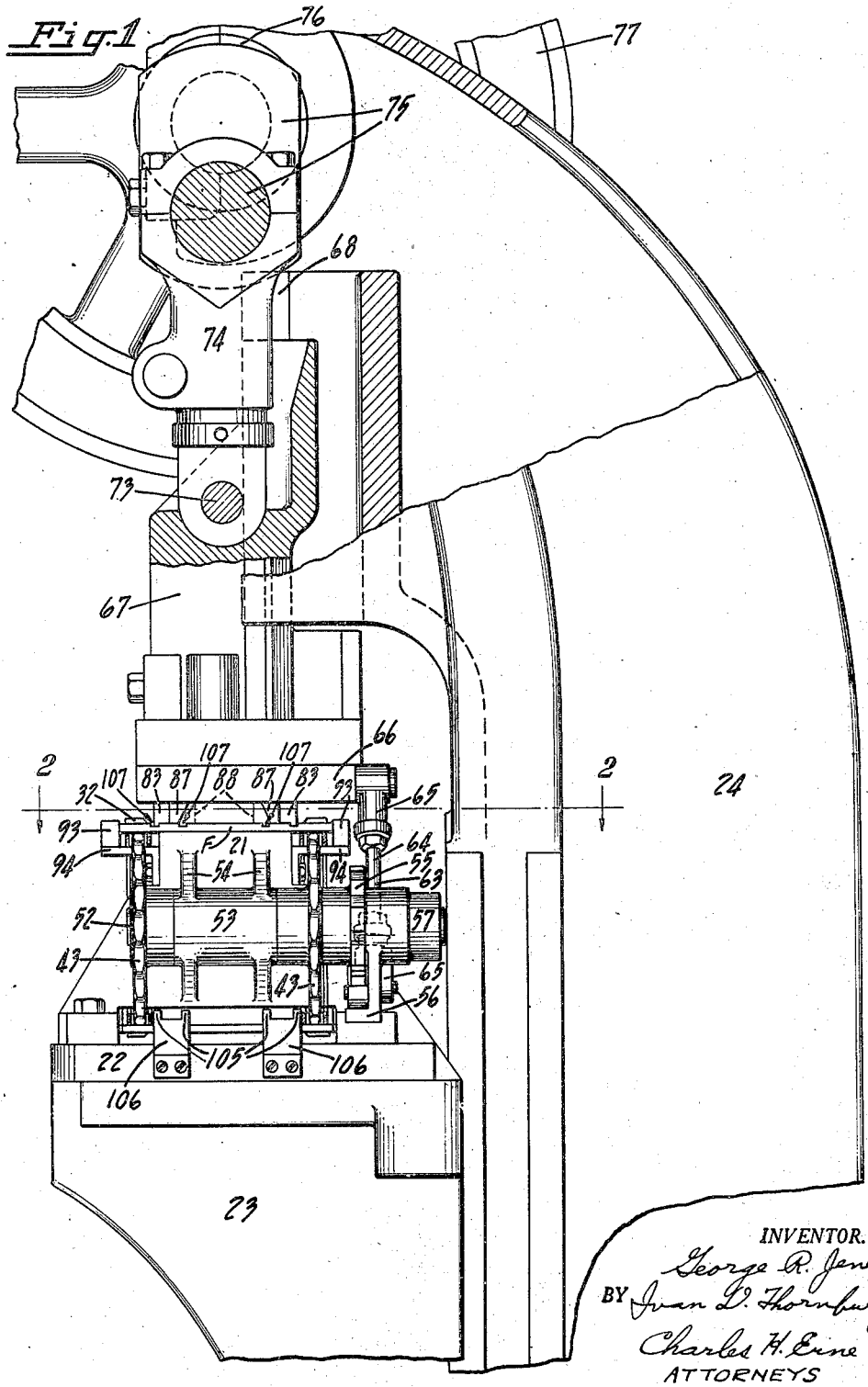

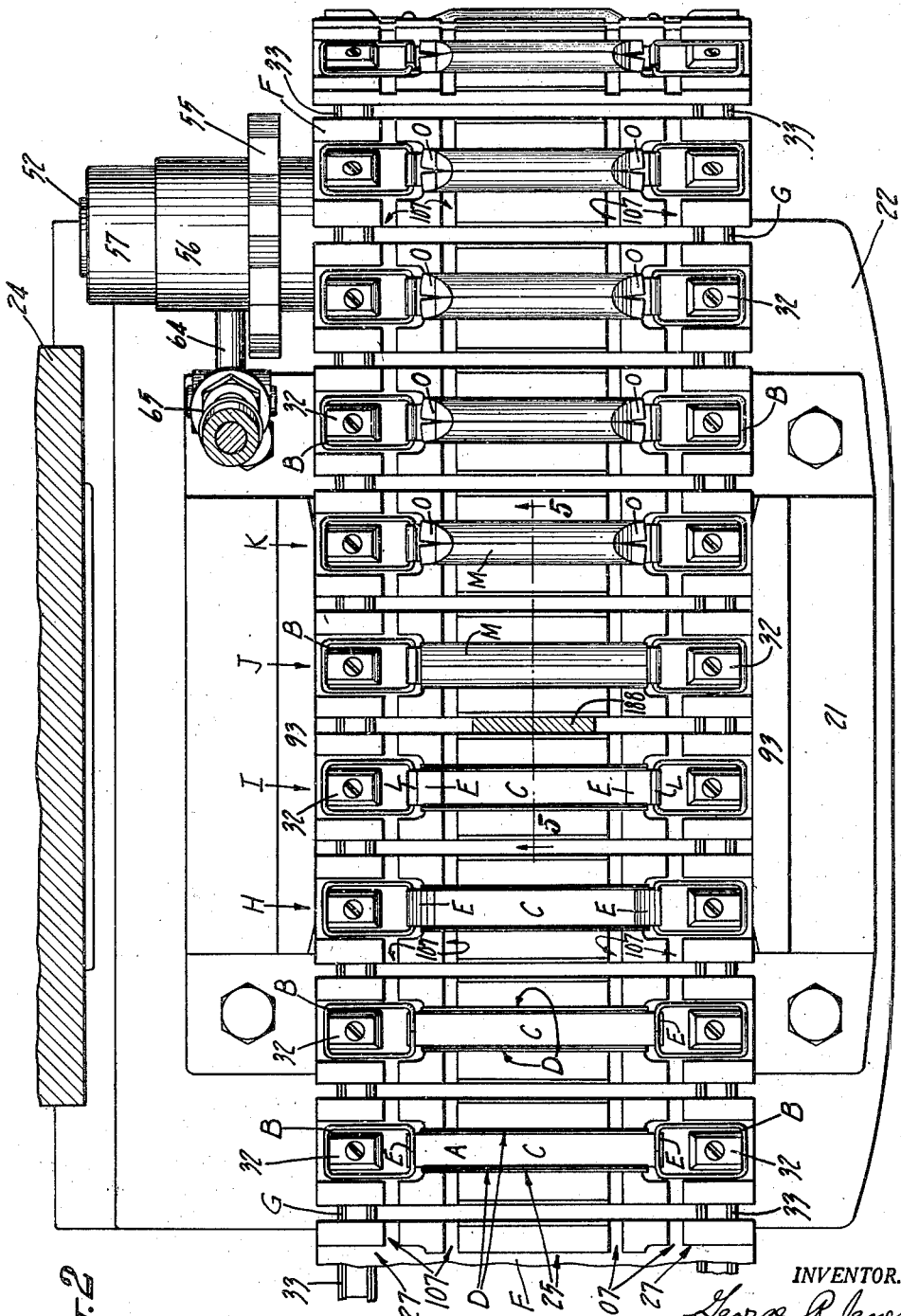

2,418,122

UNITED STATES PATENT OFFICE 2,418,122

PRESS FOR MAKING METAL HANDLES AND LINKS

George R. Jeneson, Cincinnati, Ohio, assignor to American Can Company, New York, N. Y., a corporation of New Jersey Application August 3, 1943, Serial No. 497,200

3 Claims. (Cl. 153—2)

This invention relates to a machine for producing sheet metal handles and for attaching links thereto and has particular reference to a die mechanism having die blocks mounted on an endless conveyor and carrying handle and link parts, and movable successively with the conveyor into register with punch elements which coact with the die blocks to form the handle and link parts into a unitary handle structure.

An object of the invention is the provision in a machine or punch press of a die mechanism for forming sheet metal handle and wire link parts into unitary handle structures wherein die block elements of the die mechanism are mounted on an endless conveyor actuated to move the die blocks and the handle and link parts carried thereon successively into position adjacent reciprocating punch elements of the die mechanism for coaction with the die blocks to produce the handle structures.

Another object is the provision of such a die mechanism wherein the punch elements are mounted on a reciprocating slide connecting with pawl and ratchet means for operating the conveyor in an intermittent manner so that the die blocks will be shifted successively through a plurality of working stations at which the punch elements are located to progressively produce the handle structures.

Another object is the provision of a die mechanism of this character wherein all the die blocks shifted into position at the different working stations are brought simultaneously into register with their respective punch elements at the stations by a single pilot member actuated in time with the movement of the punch elements.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a machine embodying the instant invention, with parts broken away and with parts in section;

Fig. 2 is an enlarged top plan sectional view taken substantially along the line 2—2 in Fig. 1, with parts broken away;

Fig. 3 is a front elevation of the machine shown in Fig. 1, with parts broken away and with parts in section;

Fig. 4 is a transverse section taken substantially along the broken lines 4—4 in Fig. 3;

Fig. 5 is a sectional view taken substantially along the line 5—5 in Fig. 2, with parts broken away; and Figs. 6, 7, 8 and 9 are enlarged fragmentary sectional views taken substantially along the respective lines 6—6, 7—7, 8—8 and 9—9 in Fig. 3, with parts broken away.

As a preferred embodiment of the instant invention the drawings disclose a punch press in which partly formed metal handles A are bent at the ends for connecting wire links B thereto and in which the handles are formed into final shape to produce a unitary handle structure. The partly formed handle A shown in an inverted position in all of the drawings includes a main elongated and substantially flat top portion C (Fig. 2) having upstanding and slightly curved side walls D (Fig. 5) and vertical end sections E.

The side walls D are shorter in length than the flat portion C and thus provide a clearance near the ends of each handle, so that a wire link B may be placed between the terminal edges of the side walls D and the end sections E preparatory to connecting the links to the handles. The links B are made of heavy round wire and are substantially rectangular in shape. There are two such links placed in position for assembly with every handle, one link at each end of the handle.

In the press individual handles A with their two interengaged wire links B are placed on a die member or block F by hand or by other suitable means at the feed-in end of the machine (at the left as viewed in Figs. 2 and 3). There are a number of these die members and they are secured at spaced intervals to an endless chain conveyor G. This conveyor moves over a support or anvil block 21 secured to a bolster plate 22, carried on a table 23 which is mounted on a main press frame 24.

Each die block F is made from flat stock, substantially rectangular in outline and is formed with a longitudinal groove or recess 25 (Fig. 2) which provides a seat for the flat top portion C of the handle. The ends of a seated handle project into enlarged end recesses 27 which are continuations of the long recess 25 and which provide seats for the links B interengaged with the handles. Within the end recesses 27 the die blocks F carry locating plates 32 for holding the links B in proper position relative to the handle. There are two such plates secured to each die block and located at the opposite ends of the block (Figs. 6 to 9).

The conveyor G includes a pair of spaced and parallel, horizontal endless chains 33 which travel in synchronism and along their upper runs the chains operate over support rails or angle irons 34 (Figs. 3 and 4). The angle irons are secured at one end to a bracket 35 of the anvil block 21. The outer ends of these angle irons are supported on a forked arm 36. This arm is secured at one end to a bracket 37 mounted on the table 23 and at the other to a cross bar 38 to which the angle irons are secured.

The conveyor chains 33 operate over pairs of chain sprockets 42, 43 (see also Fig. 1) located at opposite ends of the machine. The sprockets 42 are located at the feed-in end of the machine and are secured to a shaft 44 journaled in bearings 45 of a bracket 46 which is secured to the angle irons or rails 34. Elongated openings 47 in the outer ends of the rails provide for adjustment of the bracket 46 to maintain the conveyor chains in a taut condition. A setscrew 48 together with a locknut carried in the cross bar 38 is used to properly set the bracket 46 and to maintain it in an adjusted position.

The sprockets 43 are located at the discharge end of the machine and are on a shaft 52 (Figs. 1, 2 and 3) journaled in a long bearing 53 of a bracket 54, formed as an integral part of the anvil block 21. There is one sprocket at each end of the bearing.

The conveyor G is actuated in an intermittent or step-by-step manner by a ratchet and pawl actuating device which will now be explained. For this purpose the shaft 52 extends beyond the sprocket 43 at the right (as viewed in Fig. 1) and carries a ratchet wheel 55 and a loose actuating arm 56. A collar 57 is secured near the end of this shaft and holds the arm in place on the shaft.

The ratchet wheel 55 is secured to the shaft 52. This ratchet wheel is rotated in a clockwise direction (as viewed in Fig. 3) by a cooperating pawl 58 carried on the actuating arm 56. A spring 62 secured to the arm 56 tends to hold the pawl in engagement with the teeth on the ratchet wheel. Rotation of the ratchet through the pawl is brought about by a link 63 which rocks the arm 56 on the shaft 52. It is through this rocking motion that the conveyor is intermittently moved to advance the die blocks F across the anvil block 21 in a step-by-step manner.

The link 63 includes a rod 64 which is formed at its opposite ends with forked connections 65. One connection 65 is pivotally secured to the actuating arm 56 and the other to a movable punch plate 66. This punch plate is secured to and is reciprocated by a punch slide 67 operating in a vertical slideway 68 in the press frame 24.

The punch slide is pivotally carried on a pin 73 (Fig. 1) mounted in a crank or pitman 74, carried on and operated by a crank shaft 75. This crank shaft is journaled in bearings 76 in the press frame 24 and may be operated by a belt or other suitable means in cooperation with a pulley or fly wheel 77 secured to the crank shaft.

The punch plate 66 carries a plurality of bending and forming punches which cooperate with the die blocks F at four adjoining working stations H, I, J, and K disposed adjacent the anvil block 21 as viewed in Fig. 3. These punches operate simultaneously in performing successive operations on the respective handles as they are intermittently advanced across the anvil block 21 from station to station.

The handle A with its links B carried on a die block F when brought into the station H (Fig. 2) is ready for the initial bending operation. As the die block comes to rest at the station H the punch slide 67 moves down through a working stroke and brings down two spaced and parallel bending punches or die elements 82 (Figs. 5 and 6), against the end sections or walls E of the handle. Punches 82 are carried by the punch plate 66. These elements serve to bend the handle walls E from their vertical position inwardly to an inclined position and at an angle of substantially 45 degrees from the vertical. During this bending action the die block serves as a part of the bending die mechanism for the handle, the die block being supported on the anvil block 21. This is best illustrated in Figs. 2 and 6 of the drawings.

As the punch slide 67 moves up through a return stroke, it carries with it the punch plate 66 and the punches 82 and the connecting link 63. It is on this up stroke of the slide that the link 63 rotates the ratchet wheel 55. This action moves the conveyor G, as previously described, through one step and thus advances the die block, with its handle and links, to the next or adjoining station I. At this station I the end sections E of the handle are subjected to a further bending action which forms them into hinge knuckles L which extend around the wire links B at the ends of the handle, thus connecting the links to the handle. The inward terminal edge portions of the end sections E simultaneously are bent down against the flat portion C of the handle as best illustrated in Figs. 2 and 7.

The bending of the end sections E at station I is performed on the next or second working stroke of the punch slide 67 and is effected by a pair of setting punches or die elements 83 carried in the punch plate 66. These punches cooperate with the advanced die block F at rest at this station to bring about the desired bending of the handle walls E. Holddown plungers 84 also are carried in the punch plate 66 at this station and are movable therein against the tension of springs 85 housed within bores formed in the punch plate. The plungers engage the wall C of the handle in advance of the final bending action at this station. These plungers hold the handle in position on the die block F during the bending operation.

Following the operations of setting the end sections and forming the hinge knuckles L at station I, the die block F with its assembled handle and links are advanced to the next working station J. This advancement is effected as explained by actuation of the link 63 on the upward or return stroke of the punch slide 67.

With the handle and connected links in position at station J (Figs. 2 and 3), the upright and slightly curved side walls D of the handle now are formed into an arcuate handle section M (Fig. 5). Such an operation is performed by an elongated transverse handle forming punch or die element 86 carried in the punch plate 66 (see also Fig. 8). The punch is brought down against the edges of the upstanding walls D of the handle as the punch slide moves down through its third working stroke and this bends both walls inwardly toward each other and into abutting position to produce the arcuate handle section M.

Following the forming operation at station J, and on the next up stroke of the punch slide 67, the handle and link parts in their die block F are advanced to the final working station K (Figs. 2, 3 and 9). It is at this station and on the next or fourth working stroke of the slide 67 that the terminal ends of the arcuate section M of the handle are reformed. This is desirable to finish off the handle and to strengthen the hinge connection by bringing the ends of the walls D into overlapping relation with and against the inwardly bent end sections E, as best illustrated at O (see also Fig. 9).

The operation of reforming the handle ends is performed by end forming punches or die elements 87. There are two of these elements and they are carried in the punch plate 66 in spaced relation. The elements 87 press the ends of the walls D down against the end sections E and together against the wall C of the handle as it is disposed on its die block F over the anvil block 21. This action completes the progressive assembling of the handle and the wire link parts and the forming of the handle proper into desired shape and results in the unitary handle structures hereinbefore mentioned.

The bending and forming operations at the respective stations H, I, J, and K just described are performed simultaneously as adjacent die blocks F advance successive handle and link parts into and out of the stations. The die blocks F passing over the anvil block 21 are brought into alignment or register with the respective spaced and cooperating punches or die elements 82, 83, 86, 87 by a pilot or locating element 88 (Fig. 5) carried in the punch plate 66.

The pilot element 88 consists preferably of a narrow rectangular member which extends down below the punches and which is located transversely of the punch plate 66 and between the two sets of punch elements 83, 86. This pilot element is designed to enter between two adjacent die blocks F on the anvil block 21 and thus hold all four die blocks at the four working stations in register with their respective punches or die elements during the bending and forming operations. A clearance opening 92 in the anvil block receives the lower end of the pilot element.

While the die blocks F are advancing across the anvil block 21 they are guided edgewise by side guides 93. These guides are secured to side guide brackets 94 mounted on the anvil block 21.

In order to prevent over travel of the die blocks F while they are being advanced across the anvil block 21 by the conveyor G and its actuating pawl and ratchet device as hereinbefore explained, a conveyor band brake P is provided which is located at the feed-in-end of the machine (Figs. 3 and 4). This brake includes a drum 95 which is mounted on the shaft 44 intermediate its bearings 45. A band 96 having a brake lining 97 surrounds the drum.

The band 96 is secured at one end to an extension 98 of the bracket 46. The opposite end of the band carries an L-shaped lug 102. The lug is yieldably held in place by a bolt 103 and a compression spring 104 which surrounds the bolt. The bolt extends through a hole in the lug and is threadedly secured in the bracket 46. A nut 100 on the outer end of the bolt provides for tightening the spring and thus for adjusting the tension on the band. Such a band brake tends to restrain free movement of the conveyor and thus prevents over travel of the die blocks F and eliminates chain slack in the upper run of the conveyor as it moves over the anvil block 21.

At the discharge end of the press the completed handle structures are stripped from each of the die blocks F by strip-off fingers 105 (Figs. 1 and 3) as the die blocks pass around the conveyor sprockets 43 located at the said discharge end of the press. There are two pairs of the strip-off fingers 105 and they are formed on the upper ends of two plates 106 which are secured to an edge of the bolster plate 22 in spaced relation as shown in Fig. 1. These fingers are disposed in the path of travel of the completed handles and project into transverse grooves 107 formed in the die blocks F.

Thus as a die block F passes the strip-off plates 106, the fingers 105 enter into the grooves 107 and engage under and pry the handle structure from its seat in the die block. The unseated completed and composite handle structure falls into a receptacle 108 located at the discharge end of the press and on a platform 109.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a press for making a unitary handle structure of a metal handle and a metal link, the combination of a stationary anvil block, an endless conveyor intermittently movable across said anvil block, a plurality of die blocks carried on said conveyor and progressively movable therewith across said anvil block and into operative position, each of said die blocks having a central recess providing a seat for holding a partially formed handle part with an end section of the handle in an upstanding position, a holding plate secured to each die block at an end of said block recess for holding a wire link in an engaged position with the upstanding handle end, a punch member disposed above said anvil block and movable toward and away from said conveyor for coaction with a said die block while it is at rest between movements of said conveyor, said punch member including spaced die means for successively engaging and bending said upstanding end around said link while the same is being held by said plate to condition the handle for forming into final shape as a unitary composite handle structure.

2. In a press for making a unitary handle structure of a metal handle and a pair of metal links, the combination of a stationary anvil block, an endless conveyor intermittently movable across said anvil block and through spaced working stations located adjacent said anvil block, a plurality of die blocks carried on said conveyor and progressively movable therewith across said anvil blocks and into positions at said stations, each of said die blocks having a central recess providing a seat for holding a partially formed handle part with end sections of the handle in an upstanding position, a pair of holding plates secured to said die block and spaced on opposite ends of said block recess for holding a pair of wire links in engaged positions with the upstanding handle ends, a punch member disposed above said anvil block and movable toward and away from said conveyor for simultaneous coaction with said die blocks while the latter are at rest at said stations between movements of said conveyor, said punch member including spaced die members operable respectively at said stations for successively and progressively bending said upstanding ends of a said handle part around the engaged portions of its associated links while the latter are held by said holding plates to condition the handles for forming the same into unitary composite handles.

3. In a press for making a unitary handle structure of a metal handle and a pair of metal links, the combination of a stationary anvil block, an endless conveyor intermittently movable across said anvil block and through a plurality of spaced working stations located adjacent said anvil block, a plurality of die blocks carried on said conveyor and progressively movable therewith across said anvil block and into positions at said stations, each of said die blocks having a central recess providing a seat for holding a partially formed handle part with end sections of the handle in an upstanding position, a pair of holding plates secured to a said die block and spaced on opposite ends of said block recess for holding a pair of wire links in engaged positions with the upstanding handle ends, a punch member disposed above said anvil block and movable toward and away from said conveyor for simultaneous coaction with said die blocks while the latter are at rest at said stations between movements of said conveyor, said punch member including a plurality of spaced die members operable respectively at said stations, certain of said die members simultaneously and progressively bending said upstanding ends of said handle parts around the engaged portions of their associated links while the latter are held by said holding plates, and other of said die members reforming the intermediate portions of said handle parts to complete the unitary composite handles.

GEORGE R. JENESON.

REFERENCES CITED

The following references are of record in the file of this patent:

UNITED STATES PATENTS

| Number | Name | Date |
|---|---|---|
| 1,642,458 | Miller | Sept. 13, 1927 |
| 1,692,033 | Gray | Nov. 20, 1928 |
| 1,372,824 | Norris | Mar. 29, 1921 |
| 1,571,429 | Ney | Feb. 2, 1926 |
| 2,215,549 | Fraula | Sept. 24, 1940 |
| 242,772 | Halkyard | June 14, 1881 |
| 473,215 | Egge | Apr. 19, 1892 |
| 746,901 | Tucker, et al. | Dec. 15, 1903 |